Feb. 13, 1962 F. G. STEELE 3,021,062

METHODS AND APPARATUS FOR DIFFERENTIATING DIFUNCTION SIGNAL TRAINS

Filed Aug. 8, 1955 2 Sheets-Sheet 1

INVENTOR.
FLOYD G. STEELE
BY
Seymour M. Rosenberg
ATTORNEY

Feb. 13, 1962 F. G. STEELE 3,021,062

METHODS AND APPARATUS FOR DIFFERENTIATING DIFUNCTION SIGNAL TRAINS

Filed Aug. 8, 1955 2 Sheets-Sheet 2

INVENTOR.
FLOYD G. STEELE

BY
Seymour M. Rosenberg
ATTORNEY 3,021,062

METHODS AND APPARATUS FOR DIFFERENTIATING DIFUNCTION SIGNAL TRAINS

Floyd G. Steele, La Jolla, Calif., assignor to Digital Control Systems, Inc., La Jolla, Calif.

Filed Aug. 8, 1955, Ser. No. 526,933
14 Claims. (Cl. 235—152)

This invention relates to methods and apparatus for differentiating difunction signal trains, and more particularly to methods and apparatus for operating upon sequentially applied signals of an input difunction signal train non-numerically representating a varying quantity to produce an output signal train non-numerically representative of the differential or rate of change of the varying quantity.

Relatively recent developments in the field of digital computation have brought forth a new class of electronic digital computing elements in which operations are performed on and in response to what has come to be known as "difunction signal trains," as contrasted with the conventional digital computing machines which operate upon signals representing weighted binary digits. As will be disclosed in more detail hereinafter, the term "difunction signal train" refers to a train of signals each having either a first value representing a first algebraic number or a second value representing a second algebraic number, and is readily distinguished from signal trains conventional in prior art computer systems in that all the signals in the difunction signal train having the same value represent identical numbers.

For example, if it is assumed that the algebraic numbers in the difunction signal train are +1 and −1 then each of the signals in the train individually represents either a +1 or a −1 depending upon the value of the signal. Stated differently, in a difunction signal train the individual signals are unweighted, each signal having equal significance with every other signal. Accordingly, a difunction signal train may be termed a non-numerical representation of the quantity which the train represents, since the signals are not weighted according to any number system.

The representation of physical or mathematical quantities by difunction signal trains has been found to be extremely useful both in the solution of mathematical equations and in the field of automatic control. Some examples of the application of difunction representation to the solution of mathematical equations may be found in copending U.S. patent application Ser. No. 388,780, filed by the same inventor on October 28, 1953, for "Electronic Digital Differential Analyzer," wherein difunction signal trains are employed for communicating between integrators of a digital differential analyzer. Similarly, copending U.S. Patent No. 2,898,040, issued August 4, 1959, to the same inventor for "Computer and Indicator System," discloses the application of difunction signal trains to the field of process control and also discloses electronic computing circuits which operate directly to perform mathematical operations by combining difunction signals.

Although it has been found that difunction signal trains may be added together, subtracted from each other, multiplied, divided or integrated, there has existed a need for a simple, reliable, and particularly unconditionally stable method and apparatus for performing the additional mathematical operation of differentiation upon difunction signal trains.

Differentiation of a difunction signal train is defined for the purpose of the present invention as a process performed upon sequentially applied signals of a difunction signal train non-numerically representing a varying quantity which results in the production of a train of output signals non-numerically representing the rate of change of the varying quantity. Requirements for effective methods and apparatus for accomplishing the process of differentiation of applied difunction signal trains arise in many varied applications. For example, in the fields of process control and other real time control applications, knowledge of the rate of change with respect to time of a varying quantity is often required to permit anticipation of future values of the quantity. With such knowledge the type of control which is termed in the art "derivative control" may be accomplished. On the other hand, in certain types of mathematical computing machines which do not necessarily operate in real time as for example in the well known type of computing machine known as a digital differential analyzer (DDA) it may be often desirable to discover the rate of change of a varying quantity with respect to other independent variables, other than time.

In the prior art differentiation of difunction signal trains has been accomplished within a digital differential analyzer (DDA) through utilization of feed back connections between integrator sections of the DDA. The integrator sections are so interconnected that they form a closed servo loop in which their normal process of integration is utilized in an inverse manner. When thhe servo loop thereby established arrives at a stable or equilibrium condition a signal train generated within the servo loop may be shown to be the required output difunction signal train representing the rate of change of a quantity represented by an input difunction signal train applied to the servo loop.

Unfortunately a servo loop of this type is not unconditionally stable and moreover the conditions which control its stability are not well understood. For example, it is known that when the varying input quantity is small in value, the differentiating servo loop tends to become unstable and produce completely erroneous results. Many other conditions tend to cause instability in a servo loop connection of integrators. Moreover since such a servo loop requires a finite time to arrive at a stable condition it is clear that every time that the input quantity changes rapidly thus unbalancing the servo loop the servo loop will produce erroneous results until such time as it again arrives at a stability condition. In practical effect to prevent production of erroneous results undesirable restrictions must be made upon the permissible maximum rate of change of the varying quantity.

The present invention, on the other hand, provides a novel, unconditionally stable, direct operating method for differentiating an applied difunction signal train non-numerically representing a varying quantity to produce a resultant signal train representing the rate of change of the varying quantity. The method of the present invention is direct acting in that inverse usage of an integration process is not involved nor is any servo loop established whose stability is essential to operation.

According to the basic concept of the present invention the following method is used for generating a resultant signal train non-numerically representative of the rate of change of a quantity represented by an applied difunction signal train of sequentially occurring bivalued signals. First, each signal of the applied difunction signal train is delayed until $p$ additional signals occur (where $p$ is a predetermined integer). Next, each delayed signal is combined with the corresponding $p^{th}$ later occurring signal to produce a resultant signal representative of the difference between the delayed signal and the $p^{th}$ later occurring signal. The successive resultant signals thereby produced form the required output signal train which, it will be shown hereinbelow, represents the rate of change of the applied difunction signal train.

As an example of the described method for differentiating an applied difunction signal train assume that the sequentially occurring signals of the difunction signal train are $d_0$, $d_1$, $d_2$, . . . $d_{200}$ and that the integer $p$ is equal to 100 indicating that each signal of the signal train is to be combined with the 100$^{th}$ later occurring signal. In differentiating the applied difunction signal train in accordance with the present invention, signal $d_0$ is delayed until signal $d_{100}$ occurs, whereupon the delayed signal $d_0$ and the presently occurring signal $d_{100}$ are combined to form an output signal, designated $D_{100}$, which represents the difference in value of signals $d_0$ and $d_{100}$. In the same manner signal $d_1$ is delayed and then combined with later occurring signal $d_{101}$ to form a resultant output signal $D_{101}$ representative of the difference in value of signals $d_1$ and $d_{101}$. In the continuation of the described operation, pairs of signals $d_2$ and $d_{102}$, $d_3$ and $d_{103}$, . . . are combined to form resultant signals $D_{102}$, $D_{103}$, . . . respectively, each resultant output signal being representative of the difference in value of the corresponding pairs of applied input signals. The sequence of resultant signals $D_0$, $D_1$, $D_2$, $D_3$, . . . forms the required output signal train representing the rate of change of the varying quantity represented by the applied difunction signal train.

In a differentiating apparatus physically embodying the method of differentiation hereinabove described, each sequentially occurring signal of an applied difunction signal train is simultaneously applied to an input terminal of a delay element and to a first input terminal of a signal combining unit. The delay element has an output terminal which is connected to a second input terminal of the signal combining unit. The delay element functions as a type of temporary storage device, storing each signal applied to its input terminal and presenting the delayed signal at its output terminal at the same time that the $p^{th}$ later occurring signal is applied to its input terminal. Thus each time that a presently occurring signal is applied to the input terminal of the delay element and to the first input terminal of the signal combining unit, the $p^{th}$ earlier occurring signal is presented at the output terminal of the delay element and thereby applied to the second input terminal of the signal combining unit.

In operation, in each signal time, the signal combining unit simultaneously receives a presently occurring signal of the applied difunction signal train at its first input terminal and a corresponding $p^{th}$ earlier occurring signal at its second input terminal. The signal combining unit responds to each application of a pair of sginals to its first and second input terminals by producing a resultant output signal which represents the difference in value of the applied pair of signals, the successive resultant signals thereby produced forming the required differentiated signal train.

In preferred embodiments of the invention the resultant output signals produced by the signal combining unit will be bivalued signals compatible with the applied input signals, and hence the resultant output signal train will be a difunction signal train of the same type and form as the applied input difunction signal train. However it will be understood that production of tri-valued output signals by the signal combining unit is also within the scope of the present invention.

A particular embodiment of the invention is described hereinbelow in which a conventional magnetic drum memory unit is utilized as the delay or temporary storage element, while a circuit which is known in the art as a difunction subtractor is utilized in the mechanization of the signal combining unit. The magnetic memory unit has an output terminal and an input terminal to which are applied the sequentially occurring signals of a difunction signal train representing a varying quantity, a new signal of the difunction signal train being applied to the input terminal each time that a rotating drum contained within the magnetic memory unit rotates through a predetermined angular increment $\Delta x$ (where the total angular displacement of the drum is designated by the symbol $x$). Each signal applied to the input terminal of the magnetic memory unit is magnetically recorded upon a peripherally disposed channel of the rotating drum by a recording transducer positioned adjacent the channel and thereafter transported by reason of the rotation of the drum to a remote reading transducer positioned adjacent the channel at a predetermined angular spacing from the recording transducer, the reading transducer being electrically coupled to the output terminal.

The predetermined angular spacing between the recording transducer and the reading transducer, according to one embodiment of the invention, may be fixed at an integral multiple $p$ of the predetermined angular increment $\Delta x$. Thus, while a recorded signal is delayed by being transported from the recording transducer to the reading transducer, exactly $p$ additional signals of the difunction signal train will be applied to the input terminal of the memory unit, the $p^{th}$ later occurring signal being applied to the input terminal at the same time that the recorded signal is read out by the reading transducer and applied to the output terminal.

The difunction subtractor is separately connected to both the input terminal and the output terminal of the magnetic memory unit and is responsive to each pair of signals presented at these terminals for producing a resultant bivalued output signal representative of the difunction difference in value of the signals in the corresponding signal pair. The successively produced resultant output signals thereby generated comprise a resultant difunction signal train which represents the rate of change of the varying quantity with respect to the displacement $x$ of the rotating drum.

It is therefore an object of the present invention to provide unconditionally stable, direct operating methods and apparatus for differentiating a difunction signal train nonnumerically representing a varying quantity to produce a resultant difunction signal train representing the rate of change of the varying quantity.

It is another object of the present invention to provide methods and apparatus for differentiating a difunction signal train of sequentially occurring bivalued signals by delaying each signal until $p$ additional signals occur and combining each delayed signal with the corresponding $p^{th}$ later occurring signal to produce a resultant signal representative of the difference between the delayed signal and the $p^{th}$ later occurring signal, the successive resultant signals thereby produced comprising the required differentiated signal train.

It is still another object of the present invention to provide methods and apparatus for differentiating a difunction signal train of sequentially occurring bivalued signals by delaying each signal for a predetermined time interval and combining each delayed signal with a time corresponding later occurring signal to produce a series of output signals, each output signal being representative of the difference between a delayed signal and a time corresponding later applied signal.

It is a further object of the invention to provide a differentiating apparatus for operating upon an applied difunction signal train representing a varying quantity U which is a function of an independent variable $x$, a new signal $d_n$ of said signal train being applied each time $x$ increases by a predetermined increment $\Delta x$ to produce a resultant signal train representative of the quantity $dU/dx$, said apparatus receiving each applied signal and reproducing the signal when $x$ has increased by an amount $p \cdot \Delta x$ (where $p$ is a predetermined integer), and also combining each reproduced signal with the corresponding presently applied signal to produce a resultant signal of the signal train representing $dU/dx$.

It is yet another object of the present invention to provide a difunction differentiating apparatus operable upon sequentially occurring signals of a difunction signal train representing a varying quantity for combining each signal of the signal train with the corresponding $p^{th}$ later occurring signal of the signal train to produce a resultant signal representing the difference in value of the corresponding pair of signals, the successive resultant signals thereby produced forming an output signal train representative of the rate of change of the varying quantity.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limtis of the invention.

Figure 3:
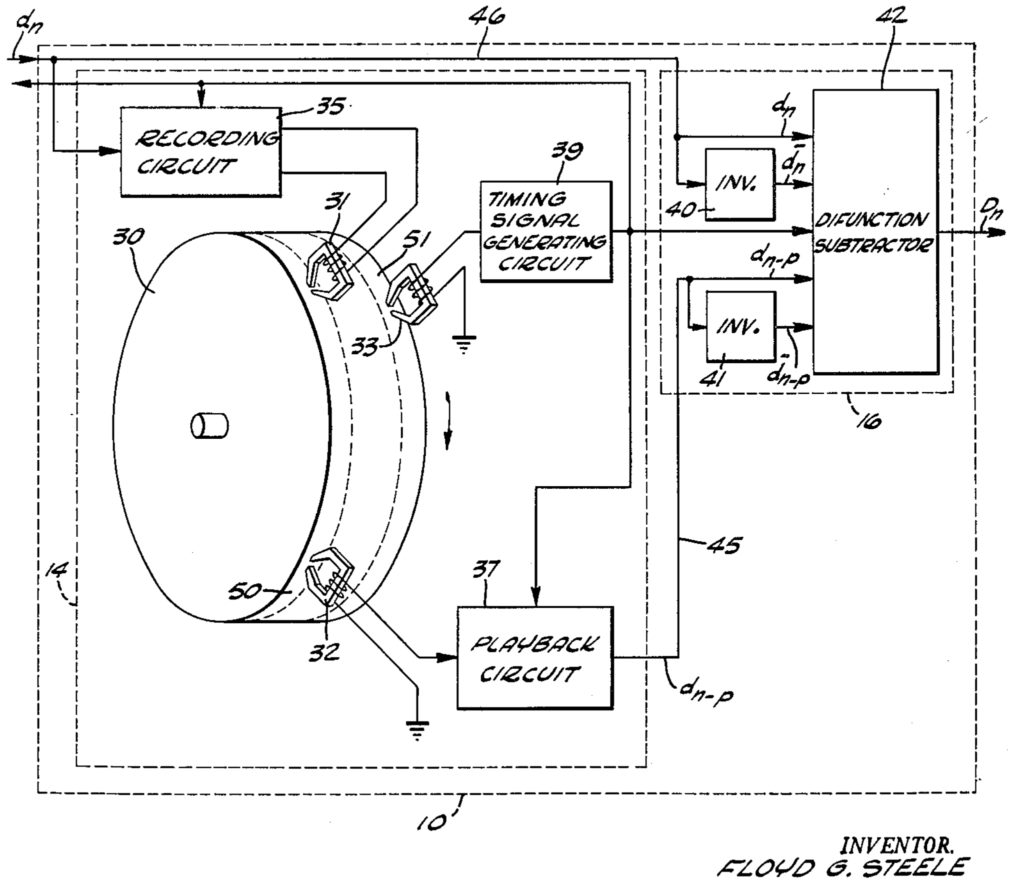
Figures 2, 2A, 2B:
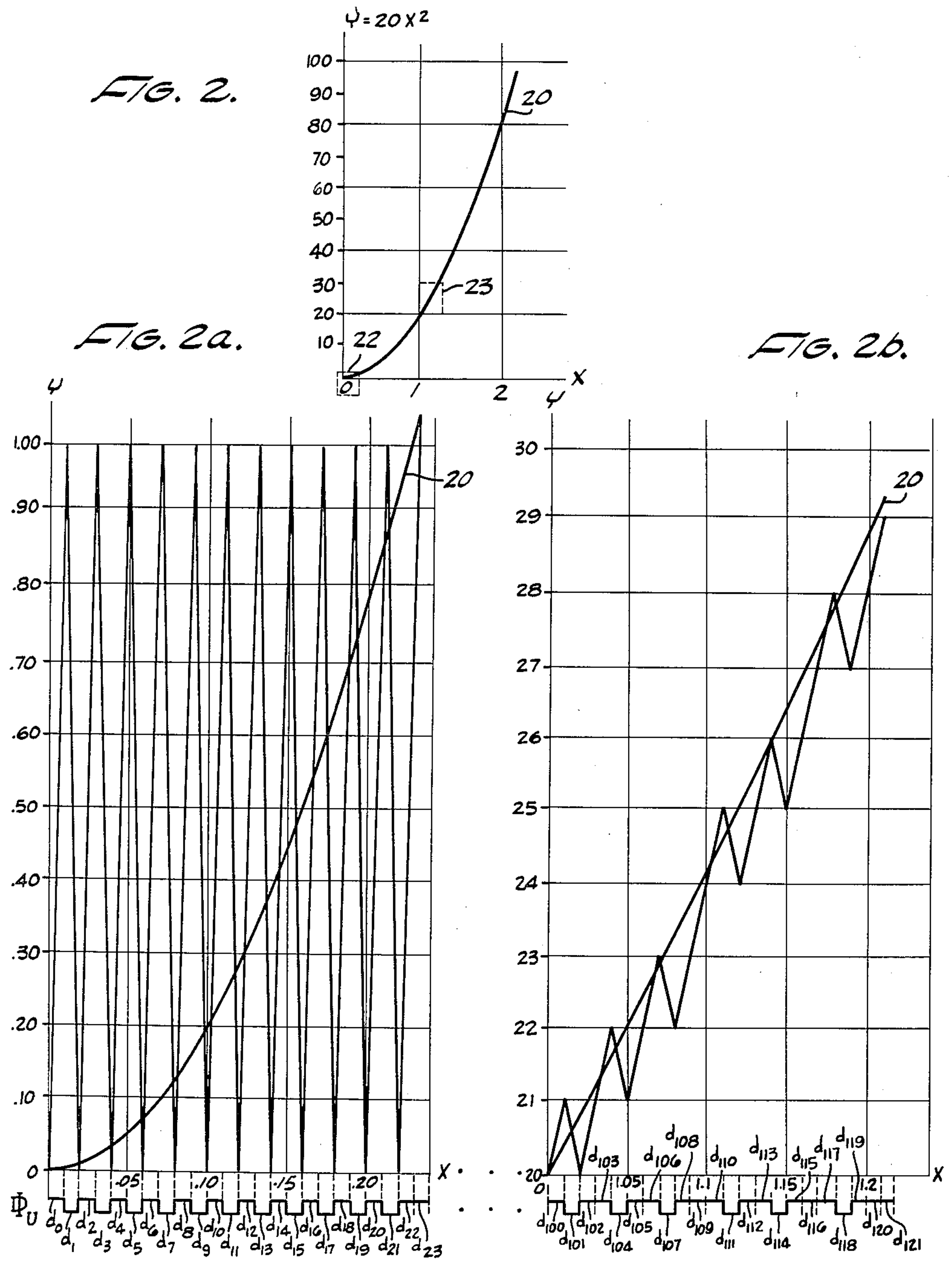
FIG. 2 is a diagram in which a curve representing a function of an independent variable $x$ is plotted.

FIG. 2*a* is a composite diagram illustrating on a greatly enlarged scale a section of the curve shown in FIG. 2 and also illustrating a difunction signal train representation of the slope of this curve;

FIG. 2*b* is another composite diagram illustrating again on a greatly enlarged scale another section, having a greatly increased slope, of the curve shown in FIG. 2, and also illustrating a difunction signal train representation thereof; and FIG. 3 is a block diagram of a preferred embodiment of a difunction differentiating apparatus according to the present invention.

Figure 1:
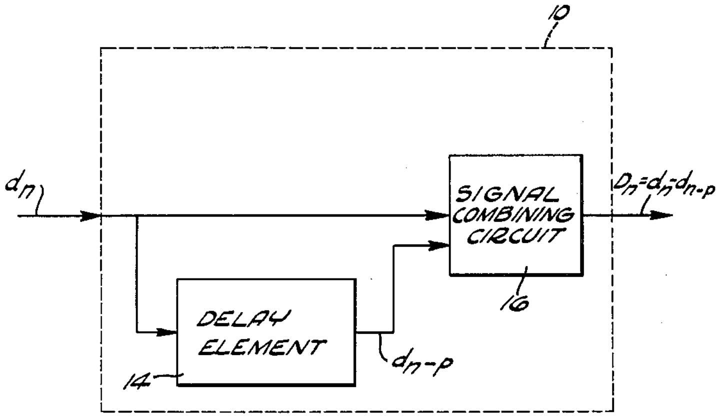
FIG. 1 is a diagram illustrating in block circuit form a generic embodiment of a differentiating apparatus according to the present invention.

Referring now to the drawings there is shown in FIG. 1 a generic embodiment of a differentiating apparatus 10 according to the present invention which is operable for generating a resultant signal train nonnumerically representative of the rate of change of a quantity U nonnumerically represented by an applied difunction signal train of sequentially occurring bivalued electrical signals $d_n$. According to the basic concept of the invention, differentiating apparatus 10 functions to delay each signal of the applied difunction signal train for a predetermined interval and to then combine each delayed signal with the simultaneously occurring later applied signal to produce a resultant signal $D_n$ representative of the difference between the values of the delayed signal and the later applied signal. It will be demonstrated hereinbelow that the series of successive resultant signals thereby produced form the required resultant signal train which represents the rate of change of the quantity U.

As shown in FIG. 1, differentiating apparatus 10 comprises a signal combining circuit 16 having a pair of input terminals and a single output terminal, and a delay element 14 having an input terminal and an output terminal. Each successive signal of the input difunction signal train is applied to one input terminal of signal combining circuit 16 and also to the input terminal of delay element 14. Delay element 14 delays each signal applied thereto until $p$ additional signals are applied to it, and then applies the delayed signal through its output terminal to the other input terminal of signal combining circuit 16. In other words, each time that signal combining circuit 16 receives a presently applied signal $d_n$ at one input terminal it also receives at the other input terminal a delayed signal from delay element 14, this delayed signal being the $p^{th}$ signal preceding the presently applied signal $d_n$ and therefore designated for purposes of clarity as signal $d_{n-p}$. As illustrated in FIG. 1 signal combining circuit 16 is responsive to each application of a pair of corresponding bivalued signals $d_n$ and $d_{n-p}$ for producing the resultant output signal $D_n$ which represents the difference of the values of signals $d_n$ and $d_{n-p}$, this relationship being symbolically stated by the equation $D_n=d_n-d_{n-p}$.

If it is assumed, for example, that $p=100$ and that in operation a difunction signal train of 200 sequentially occurring bivalued signals, designated $d_0$, $d_1$, $d_2$, . . . $d_{199}$ respectively, representing a variable quantity U is applied to differentiating apparatus 10, delay element 14 then operates to reproduce signal $d_0$ at its output terminal at the time signal $d_{100}$ is applied to its input terminal. Thus in operation signal combining circuit 16 would simultaneously receive at one of its input terminals the delayed signal $d_0$ from delay element 14 and at the other of its input terminals the presently applied signal $d_{100}$. The combining unit 16 then functions to combine the bivalued signals $d_0$ and $d_{100}$ to produce a resultant output signal designated $D_{100}$ which represents the difference of the values of signals $d_0$ and $d_{100}$. In the same manner in subsequent signal periods, combining circuit 16 would receive and combine the signal pairs $d_1$ and $d_{101}$, $d_2$ and $d_{102}$, $d_3$ and $d_{103}$ . . . to produce respectively corresponding output signals $D_{101}$, $D_{102}$, $D_{103}$ . . . which respectively represent the difference of the values of the associated signal pairs.

It will be demonstrated at a later point in the present application that the output signal train comprising signals $D_{100}$, $D_{101}$, $D_{102}$ . . . does in fact represent the rate of change of the quantity U. However before any demonstration can be made of the correctness of the hereinbefore described method for effectively differentiating a difunction signal train, it is first necessary that the basic principles of difunction signal representation of varying quantities as it is known in the art, be thoroughly understood.

The use of a difunction signal train for the nonnumerical representation of quantity magnitudes is a relatively recent development in the electronic digital computing and switching arts. As explained hereinbefore the term difunction signal train refers to a train of bi-valued electrical signals, each having either a first value representing a first algebraic number $N_1$ or a second value representing a second algebraic number $N_2$. In contrast to numerical code signal trains customarily used in the prior art in which each signal represents a digit of a number, each like valued signal in a difunction signal train has the same weight or significance. Accordingly, a difunction signal train represents a quantity non-numerically since the signals of the train are unweighted and therefore do not correspond to the digits of any number.

Difunction signal trains may take numerous equivalent forms, the most common of which are a train of unipolar pulse signals in which the presence or absence of each pulse signal indicates the value of the signal, a train of bipolar electrical pulse signals in which the polarity of each pulse signal indicates the value of the signal, and a train of bilevel electrical signals in which the level of each signal indicates the value of the signal. For purposes of clarity, only the bilevel signal form will be shown in the present specification. However it will be clear to those skilled in the art that other bivalued signal forms may be readily utilized in accordance with the invention.

The following plan will be adopted in the present specification for clarifying the nature of difunction signal representation of varying quantities and for thereafter demonstrating the operation of differentiating apparatus 10 shown in FIG. 1:

First, by mathematical processes, there will be discovered the form a difunction signal train would have which represents a varying quantity $U=.4x$ where $x$ is an independent variable and U is a quantity whose magnitude is a function of the magnitude of the variable $x$. The signal train which will be derived will utilize the $+1$, $-1$ class of difunction representation. That is, each sequential bivalued signal in the signal train will represent either a predetermined first number $N_1=+1$ or a predetermined second number $N_2=-1$.

Next, it will be assumed, for purposes of example, that the successive bivalued signals of the difunction signal train representing $U=.4x$ are sequentially applied to differentiating apparatus 10 shown in FIG. 1. It will then be demonstrated that the resultant difunction signal train produced by apparatus 10 will represent a quantity proportional to $dU/dx$, the rate of change of the quantity U with respect to the independent variable $x$. It will be apparent to those skilled in the art that for the example chosen the quantity $dU/dx$ will be a constant (since $d/dx$ of $.4x$ equals .4) and therefore the resultant difunction signal train produced by the preferred embodiment of differentiating apparatus 10 should represent a fixed or constant quantity proportional to the quantity $$\frac{dU}{dx}=.4$$

That such a result is indeed obtained will be shown both analytically and by direct demonstration.

Finally, to further clarify the operation of differentiating apparatus 10, shown in block diagram form in FIG. 1, a detailed description will be provided of a preferred embodiment of differentiating apparatus 10. In addition still other embodiments and variations of differentiating apparatus 10 will be described.

The mathematical process which will be utilized in the present specification for the discovery of the difunction signal train representing the quantity $U=.4x$ is basically similar to the process which is utilized in a type of analog-to-difunction input conversion device termed an "Angular Quantizer" fully disclosed in copending U.S. Patent No. 2,733,430, issued January 31, 1956, for "Angular Quantizer" to the present inventor. As disclosed in that application an angular quantizer is a device which when coupled to a rotating shaft develops a difunction signal train of sequential bivalued signals representing the rate of change of angular displacement of the shaft. Ordinarily, as described in the aforementioned copending application, a difunction signal train developed by an angular quantizer represents the rate of change of shaft displacement with respect to time, a new bivalued signal of the signal train being produced at fixed time intervals or increments as marked by periodic equi-time-spaced timing signals applied to the angular quantizer.

However in its more general application, an angular quantizer may be utilized to develop a difunction signal train representing the rate of change of shaft displacement with respect to any monotonically increasing variable $x$, the angular quantizer then developing a new bivalued signal of the corresponding difunction signal train each time that the variable $x$ increases by a predetermined fixed increment $\Delta x$. In this more general type of operation of an angular quantizer a new timing signal is applied to the quantizer each time the variable $x$ increases by the fixed increment $\Delta x$ rather than when time increases by a fixed increment. The normal operation of a quantizer in which the rate of change of shaft displacement with respect to time is developed is therefore seen to be merely a special case of the more general operation of the device, that is that special case in which the independent variable $x$ is equal to time and the fixed increment $\Delta x$ is a fixed increment or interval of time.

In a very similar manner it is possible to mathematically discover the form of a difunction signal train designated $\mathcal{D}_U$ which represents the quantity $U=.4x$ by starting with an analytic quantity $y=20x^2$ and to derive a series of successive bivalued +1 and −1 representing signals which represents the rate of change with respect to $x$ of the quantity $y$. For those who prefer a physical model when following a mathematical process it will be helpful to think of the quantity $y$ as representing the angular displacement of a shaft and to think of the bivalued +1 and −1 representing signals which will be derived as the signals issuing from an angular quantizer coupled to the shaft. However it will be understood by those skilled in the art that the difunction signal train $\mathcal{D}_U$ representing the quantity $U=.4x$ might in practice arise from many other different types of sources, as for example from an integrator section of a digital differential analyzer—see U.S. application Serial No. 388,780 for "Electronic Digital Differential Analyzer," filed by the same inventor on October 28, 1953.

Referring now to FIG. 2 there is shown a graph in which the quantity $y=20x^2$ is plotted as an ordinate against an independent variable $x$ as an abscissa to form a curve 20 shown in FIG. 2. It is intended to assign a +1 or −1 representing difunction signal of the signal train $\mathcal{D}_U$ for each increment $\Delta x$ of the independent variable (where $\Delta x$ is arbitrarily set equal to .01) in such manner that the sum of the +1 and −1 values of the difunction signals arising between any two values of $x$ is as close as possible to the total change in $y$ for a corresponding change in $x$. An assignment of values for the successive difunction signals of signal train $\mathcal{D}_U$ can be accomplished in such a manner that for any increase in $x$ the corresponding increase in $y$ differs from the sum of the values of the corresponding intervening difunction signals of signal train $\mathcal{D}_U$ by an amount not exceeding $\pm 2$.

This result may be accomplished by comparing, after each increment $\Delta x$ (where $\Delta x=.01$) in $x$, the magnitude of $y$ with the magnitude of a summation designated S, of the values of the preceding difunction signals. If the magnitude of S exceeds the corresponding magnitude of $y$, the value −1 is assigned to the next difunction signal to decrease S, while if the magnitude of S is less than the corresponding magnitude of $y$, a +1 value is assigned to the next difunction signal to increase S. By following this procedure for each increment $\Delta x$ in $x$, values may be successively assigned to each sequential difunction signal in the desired difunction signal train $\mathcal{D}_U$.

To illustrate the described process, it is desirable to plot the sum S and the corresponding difunction signals of signal train $\mathcal{D}_U$ on the same scale with $y$, and for this purpose two portions of curve 20 shown in FIG. 2 have been redrawn to separate greatly enlarged scales in FIGS. 2*a* and 2*b* respectively. In FIG. 2*a* there is drawn that portion of curve 20 which lies within dotted lines 22 shown in FIG. 2, while in FIG. 2*b* there is drawn that portion of curve 20 which lies within dotted lines 23 also shown in FIG. 2.

Referring now to FIG. 2*a*, it is seen that the waveform of successive bivalued signals of the signal train $\mathcal{D}_U$ is drawn to the same scale as $x$, there being one bivalued signal of signal train $\mathcal{D}_U$ for each increment $\Delta x$ in $x$. In addition for each incremental value of $x$, the magnitude of the summation S of the values of the signals of signal train $\mathcal{D}_U$ is plotted on the same scale to which $y$ is plotted. For example, as shown in FIG. 2*a*, an initial signal, designated $d_0$, of signal train $\mathcal{D}_U$ is at a high level which (according to a usual convention) represents a +1 value for the signal. Thus after one increment $\Delta x$ in $x$, when $x=.01=1.\Delta x$, the magnitude of the summation S of the preceding difunction signals is +1, as shown in FIG. 2*a*, a magnitude which is obviously greater than the magnitude of $y$ at the same value of $x$. Therefore in accordance with the rule explained hereinabove, the next signal (signal $d_1$) of signal train $\mathcal{D}_U$ is assigned a −1 value so as to decrease the magnitude of the summation S to zero once again. Signal $d_1$ as shown in FIG. 2*a* is therefore at a low −1 representing level.

It is seen, from FIG. 2*a*, therefore, that after the next increment of $x$, when $x=.02=2.\Delta x$ the magnitude of S is less than the corresponding magnitude of $y$, and thus in accordance with the hereinabove explained rule the value +1 is assigned to the next signal (signal $d_2$) of signal train $D_U$. In the same manner in the continuation of the described process alternate $-1$ and $+1$ representing values are assigned to the signals $d_3$, $d_4$, $d_5$ . . . through $d_{22}$ as shown in FIG. 2*a*. The $+1$ value of signal $d_{22}$ causes the sum S to rise to a magnitude of $+1$ when $x=.23=23.\Delta x$. However at this point the magnitude of the summation S is less than the corresponding magnitude of $y$ and therefore the next difunction signal (signal $d_{23}$) is assigned a high or $+1$ representing value, this "extra" $+1$ value constituting the first departure from the alternation of $+1$ and $-1$ values wihch characterized the preceding difunction signals.

It should be clear in view of the foregoing explanation, that in the continuation of the described process as the slope of curve 20 of the function $y=20x^2$ continues to increase, more and more "extra" $+1$ values will be introduced into the difunction signal train $D_U$. In other words, with increased slope of curve 20, there will be a relatively high frequency of extra $+1$ values, and as a result thereof the jagged plot of the summation S will follow and fit itself to curve 20 of the function $y=20x^2$ to a good degree of approximation.

For example, referring now to FIG. 2*b*, it is seen that in the continuation of the described process when $x=1=100.\Delta x$ the magnitude of the summation S is 20 and is therefore equal to the corresponding magnitude of $y$. The choice made in this event is that a $+1$ value is assigned to the next difunction signal (signal $d_{100}$) in the same manner that a $+1$ value was assigned to the initial difunction signal $d_0$. The $+1$ value of signal $d_{100}$ brings the summation S to the value 21 when $x=1.01=101.\Delta x$ a magnitude of S which is greater than the corresponding magnitude of $y$. Signal $d_{101}$ then has a $-1$ value, bringing S below $y$ at $x=1.02=102.\Delta x$. Thereafter signals $d_{102}$ and $d_{103}$ each have $+1$ values before the summation S of difunction signals again rises above $y$ at $x=1.04=104.\Delta x$. In the same manner $+1$ or $-1$ values may be assigned to each of the remaining signals of difunction signal train $D_U$.

It is seen that each successive difunction signal is assigned a value which tends to reduce any inequality between the magnitude of the summation S and the corresponding magnitude of $y$. As a result, if it is assumed that $y$ does not change by more than an increment of 1, for an increment $\Delta x$ in $x$, then it follows that any inequality between a value of $y$ and a succeeding value of S cannot exceed $\pm 1$. It is therefore clear that the total difference between two spaced values of $y$ must be very nearly equal to the difference between the respectively succeeding values of S, varying therefrom by at most $\pm 2$.

The foregoing concepts can be restated in terms of relatively simple mathematical formulas. For example $\epsilon$ is defined as a quantity not exceeding 1 in magnitude, Formula 1 hereinbelow provided states in mathematical terms the condition that any value of $y$ at $x=m.\Delta x$ cannot differ from the succeeding value of S at $x=(m+1).\Delta x$ by more than $\pm 1$.

$$y_m=S_{m+1}+\epsilon \qquad (1)$$

Suppose that two spaced values of $y$ are considered, these values of $y$ being $y_m$ and $y_{m+h}$, where $h$ is any integer. Then it follows from Formula 1 that:

$$y_m=S_{m+1}+\epsilon \qquad (1)$$

and by analogy $$y_{m+h}=S_{m+h+1}+\epsilon \qquad (1a)$$

Subtracting both terms of Formula 1 from the corresponding terms of Formula 1*a* there is obtained the following Formula 2:

$$y_{m+h}-y_m=S_{m+h+1}-S_{m+1}+2\epsilon \qquad (2)$$

Formula 2, derived above, is a statement in mathematical terms of the proposition that the total difference between two spaced values of $y$ is very nearly equal to the difference between the respectively succeeding values of S varying therefrom by at most $\pm 2$.

It will be remembered however that the summation S is defined as the summation of the preceding difunction signals $d_n$. It is therefore clear in view of this definition, that for the present example $$S_{m+1}=\sum_{n=0}^{m} d_n \qquad (3a)$$

and that $$S_{m+h+1}=\sum_{n=0}^{m+h} d_n \qquad (3b)$$

Subtracting each term of Equation 3*a* from the corresponding term of Equation 3*b* there is obtained the following Equation 4 which relates the difference of two values of S to the sum of the values of the intervening difunction signals.

$$S_{m+h+1}-S_{m+1}=\sum_{n=m+1}^{m+h} d_n \qquad (4)$$

The expression for $S_{m+h+1}-S_{m+1}$ found in Equation 4 may next be substituted in Equation 2 to obtain the following equation which relates the difference of two values of $y$ to the sum of the values of the intervening difunction signals.

$$y_{m+h}-y_m=\sum_{n=m+1}^{m+h} d_n+2\epsilon \qquad (5a)$$

From Equation 5*a* it is relatively easy to demonstrate that for any two spaced values of $y$, $y_{m+h}$ and $y_m$ the average value of the intervening difunction signals $$\frac{\sum_{n=m+1}^{m+h} d_n}{h}$$

is very nearly equal to a quantity proportional to the average rate of change of $y$ with respect to $x$ between the two spaced values of $y$. To prove this proposition Equation 5*a* is first rewritten as follows:

$$\sum_{n=m+1}^{m+h} d_n=y_{m+h}-y_m+2\epsilon \qquad (5b)$$

Dividing both sides of Equation 5*b* by the quantity $h$, there is obtained the following equation:

$$\frac{\sum_{n=m+1}^{m+h} d_n}{h}=\frac{y_{m+h}-y_m}{h}+\frac{2\epsilon}{h} \qquad (6)$$

Equation 6 may be rewritten in the form:

$$\frac{\sum_{n=m+1}^{m+h} d_n}{h}=\Delta x\left(\frac{y_{m+h}-y_m}{h.\Delta x}\right)+\frac{2\epsilon}{h} \qquad (7)$$

In Equation 7, the expression in the parentheses is clearly the average rate of change of $y$ with respect to $x$ over the interval between $y_m$ and $y_{m+h}$, this being an interval in which $x$ increases by $h.\Delta x$ from a value of $m.\Delta x$ to a value of $(m+h).\Delta x$. Thus Equation 7 states in mathematical terms that the average value of the difunction signals intervening between the values $y_m$ and $y_{m+h}$ is very nearly equal to $\Delta x$ times the average rate of change of $y$ with respect to $x$ between the same limits, differing therefrom by an error of at most $\pm 2/h$.

According to a well known mathematical theorem for continuous functions of the type considered, the average rate of change of $y$ with respect to $x$ over a predetermined interval is equal to $dy/dx$, the instantaneous rate of change of $y$ with respect to $x$ at some point within the interval. Moreover for a small interval, to a first order of approximation the average value of the rate of change of $y$ with respect to $x$ over the interval is equal to the value of $dy/dx$ evaluated at the midpoint of the interval. This concept is stated mathematically by the following:

$$\frac{y_{m+h}-y_m}{h.\Delta x}\cong\left(\frac{dy}{dx}\right)_{m+\frac{h}{2}} \qquad (8)$$

Substituting this approximation in Equation 7 yields the following:

$$\frac{\sum_{n=m+1}^{m+h} d_n}{h}\cong\Delta x\left(\frac{dy}{dx}\right)_{m+\frac{h}{2}}+\frac{3\epsilon}{h} \qquad (9)$$

Formula 9 above states the general conclusion that for a sufficiently small interval of $x$, the average value of the difunction signals within the interval is very nearly equal to $\Delta x$ times the instantaneous rate of change of $y$ with respect to $x$ as evaluated at the midpoint of the interval, with the error due to the use of the difunction average not exceeding $\pm 2/h$. Thus the quantity U represented by the difunction signal train over an interval is approximately equal to $$\Delta x.\frac{dy}{dx}$$

evaluated at the midpoint of the interval.

By applying Formula 9 to the signal train $\not{D}_U$ shown in FIGS. 2*a* and 2*b*, it will be shown that signal train $\not{D}_U$ continuously represents the quantity $U=.4x$, in the sense that the average value of the difunction signals produced within any interval of $x$ is approximately equal to .4 times the value of $x$ at the midpoint of the interval. It will be remembered that in the present example:

$$y=20x^2 \qquad (10)$$

Differentiation of both sides of Equation 10 with respect to $\Delta x$, produces a resultant equation:

$$\frac{dy}{dx}=40x \qquad (11)$$

By substituting the particular value of $dy/dx$ found in Equation 11 into the general Formula 9, there is obtained the following Formula 12 which defines the quantity represented by the average value of any sequence of $h$ signals of the particular signal train $\not{D}_U$ shown in FIGS. 2*a* and 2*b*.

$$\frac{\sum_{n=m+1}^{m+h} d_n}{h}\cong\Delta x(40)x_{x=\left(m+\frac{h}{2}\right).\Delta x}+\frac{2\epsilon}{h} \qquad (12)$$

Since in the present example $\Delta x=.01$, Formula 12 above may be rewritten as:

$$\frac{\sum_{n=m+1}^{m+h} d_n}{h}\cong(.4x)_{x=\left(m+\frac{h}{2}\right).01}+\frac{2\epsilon}{h} \qquad (13)$$

According to Formula 13 therefore the average value of any sequence of $h$ signals of signal train $\not{D}_U$ shown in FIGS. 2*a* and 2*b* is indeed approximately equal to the quantity $U=.4x$, where $x$ is evaluated for the midpoint of the interval which includes the signals, the error in this approximation not exceeding $\pm 2/h$.

The meaning and application of Formula 13 will be clarified by a brief numerical example. Consider in FIG. 2*b* that section of signal train $\not{D}_U$ which is included within the interval $x=1.06=106\Delta x$ to $x=1.17=117\Delta x$. If this interval be described as the interval from $x=m\Delta x$ to $(m+h)\Delta x$ then it is clear that $m=106$ and $h=11$. The midpoint of this interval is $$x=\left(m+\frac{h}{2}\right).\Delta x=1.115$$

The value of $U=.4x$ at this midpoint of the interval is therefore:

$$U=.4x=.4.(1.115)=.4460 \qquad (14)$$

According to Formula 13

$$\frac{\sum_{n=m+1}^{m+h} d_n}{h}\cong(.4x)_{x=\left(m+\frac{h}{2}\right)\Delta x}+\frac{2\epsilon}{h} \qquad (13)$$

Substituting values of the present example yields:

$$\frac{\sum_{n=107}^{117} d_n}{11}\cong.4460+\frac{2\epsilon}{11} \qquad (15)$$

Expanding there is obtained $$\frac{D_{107}+D_{108}\ .\ .\ .\ D_{117}}{11}\cong.4460+\frac{2\epsilon}{11} \qquad (16)$$

Substituting the +1 and −1 values of signals $D_{107}$ through $D_{117}$ respectively there is obtained:

$$\frac{5}{11}\cong.4460+\frac{2\epsilon}{11} \qquad (17)$$

and reducing the fraction 5/11 it is found that:

$$.4545=.4460+2/11 \qquad (18)$$

Expression 18 above demonstrates that the average value (.4545) of the 11 difunction signals of signal train $\not{D}_U$ included within the interval from $x=106\Delta x$ to $x=117\Delta x$ is indeed approximately equal to the value (.4460) of $U=.4x$ evaluated at the midpoint of the interval, the error being .4545—.4460=.0085, a magnitude of error which is well within the maximum expected error of $$\frac{\pm 2}{11},\ (.1818)$$

By averaging over a longer sequence of signals a still better approximation to the value $U=.4x$ at the midpoint of the signal sequence may be obtained, for as the number of signals $h$ increases the magnitude of the maximum expected error $\pm 2/h$ will decrease correspondingly. In practice averaging is accomplished over a sufficiently large number of signals $h$ that the maximum expected error $\pm 2/h$ is reduced to a negligible magnitude. Thus if accuracy of one part in 500 in the determination of the value of U were desired, averaging would be accomplished over 1000 signals of the signal train $\not{D}_U$, while with an accuracy requirement of one part in 50, 100 signals of signal train $\not{D}_U$ would be averaged to obtain the value of U at the midpoint of the signal sequence.

In FIGS. 2*a* and 2*b* only short sections of the difunction signal train $\not{D}_U=.4x$ have ben shown. Referring now to Table I provided hereinbelow there are tabulated values for 224 successive signals, signals $d_0, d_1, d_2\ .\ .\ .\ d_{224}$, of signal train $\not{D}_U$. Along with the values of signals $d_0$ through $d_{224}$ there are also tabulated corresponding values of $x$, $y$, and $S$, these being provided so that the reader, if interested, may check the derivation of the values of the associated difunction signals.

*Table I*

| $n$ | ($\Delta x=.01$) $x=n.\Delta x$ | $y=20x^2$ | S | $d_n$ | $D_n=d_n-d_{n-p}$ |
|---|---|---|---|---|---|
| 0 | 0.00 | 0.000 | 0 | + | ---------- |
| 1 | 0.01 | 0.002 | 1 | − | ---------- |
| 2 | 0.02 | 0.008 | 0 | + | ---------- |
| 3 | 0.03 | 0.018 | 1 | − | ---------- |
| 4 | 0.04 | 0.032 | 0 | + | ---------- |
| 5 | 0.05 | 0.050 | 1 | − | ---------- |
| 6 | 0.06 | 0.072 | 0 | + | ---------- |
| 7 | 0.07 | 0.098 | 1 | − | ---------- |
| 8 | 0.08 | 0.128 | 0 | + | ---------- |
| 9 | 0.09 | 0.162 | 1 | − | ---------- |
| 10 | 0.10 | 0.200 | 0 | + | ---------- |
| 11 | 0.11 | 0.242 | 1 | − | ---------- |
| 12 | 0.12 | 0.288 | 0 | + | ---------- |
| 13 | 0.13 | 0.338 | 1 | − | ---------- |
| 14 | 0.14 | 0.392 | 0 | + | ---------- |
| 15 | 0.15 | 0.450 | 1 | − | ---------- |
| 16 | 0.16 | 0.512 | 0 | + | ---------- |
| 17 | 0.17 | 0.578 | 1 | − | ---------- |
| 18 | 0.18 | 0.648 | 0 | + | ---------- |
| 19 | 0.19 | 0.722 | 1 | − | ---------- |
| 20 | 0.20 | 0.800 | 0 | + | ---------- |
| 21 | 0.21 | 0.882 | 1 | − | ---------- |

*Table 1*—Continued

| $n$ | ($\Delta x$=.01) $x=n.\Delta x$ | $y=20x^2$ | S | $d_n$ | $D_n=d_n-d_{n-p}$ |
|---|---|---|---|---|---|
| 22 | 0.22 | 0.968 | 0 | + | ------ |
| 23 | 0.23 | 1.058 | 1 | + | ------ |
| 24 | 0.24 | 1.152 | 2 | − | ------ |
| 25 | 0.25 | 1.250 | 1 | + | ------ |
| 26 | 0.26 | 1.352 | 2 | − | ------ |
| 27 | 0.27 | 1.458 | 1 | + | ------ |
| 28 | 0.28 | 1.568 | 2 | − | ------ |
| 29 | 0.29 | 1.682 | 1 | + | ------ |
| 30 | 0.30 | 1.800 | 2 | − | ------ |
| 31 | 0.31 | 1.922 | 1 | + | ------ |
| 32 | 0.32 | 2.048 | 2 | + | ------ |
| 33 | 0.33 | 2.178 | 3 | − | ------ |
| 34 | 0.34 | 2.312 | 2 | + | ------ |
| 35 | 0.35 | 2.450 | 3 | − | ------ |
| 36 | 0.36 | 2.592 | 2 | + | ------ |
| 37 | 0.37 | 2.738 | 3 | − | ------ |
| 38 | 0.38 | 2.888 | 2 | + | ------ |
| 39 | 0.39 | 3.042 | 3 | + | ------ |
| 40 | 0.40 | 3.200 | 4 | − | ------ |
| 41 | 0.41 | 3.362 | 3 | + | ------ |
| 42 | 0.42 | 3.528 | 4 | − | ------ |
| 43 | 0.43 | 3.698 | 3 | + | ------ |
| 44 | 0.44 | 3.872 | 4 | − | ------ |
| 45 | 0.45 | 4.050 | 3 | + | ------ |
| 46 | 0.46 | 4.232 | 4 | + | ------ |
| 47 | 0.47 | 4.418 | 5 | − | ------ |
| 48 | 0.48 | 4.608 | 4 | + | ------ |
| 49 | 0.49 | 4.802 | 5 | − | ------ |
| 50 | 0.50 | 5.000 | 4 | + | ------ |
| 51 | 0.51 | 5.202 | 5 | + | ------ |
| 52 | 0.52 | 5.408 | 6 | − | ------ |
| 53 | 0.53 | 5.618 | 5 | + | ------ |
| 54 | 0.54 | 5.832 | 6 | − | ------ |
| 55 | 0.55 | 6.050 | 5 | + | ------ |
| 56 | 0.56 | 6.272 | 6 | + | ------ |
| 57 | 0.57 | 6.498 | 7 | − | ------ |
| 58 | 0.58 | 6.728 | 6 | + | ------ |
| 59 | 0.59 | 6.962 | 7 | − | ------ |
| 60 | 0.60 | 7.200 | 6 | + | ------ |
| 61 | 0.61 | 7.442 | 7 | + | ------ |
| 62 | 0.62 | 7.688 | 8 | − | ------ |
| 63 | 0.63 | 7.938 | 7 | + | ------ |
| 64 | 0.64 | 8.192 | 8 | + | ------ |
| 65 | 0.65 | 8.450 | 9 | − | ------ |
| 66 | 0.66 | 8.712 | 8 | + | ------ |
| 67 | 0.67 | 8.978 | 9 | − | ------ |
| 68 | 0.68 | 9.248 | 8 | + | ------ |
| 69 | 0.69 | 9.522 | 9 | + | ------ |
| 70 | 0.70 | 9.800 | 10 | − | ------ |
| 71 | 0.71 | 10.082 | 9 | + | ------ |
| 72 | 0.72 | 10.368 | 10 | + | ------ |
| 73 | 0.73 | 10.658 | 11 | − | ------ |
| 74 | 0.74 | 10.952 | 10 | + | ------ |
| 75 | 0.75 | 11.250 | 11 | + | ------ |
| 76 | 0.76 | 11.552 | 12 | − | ------ |
| 77 | 0.77 | 11.858 | 11 | + | ------ |
| 78 | 0.78 | 12.168 | 12 | + | ------ |
| 79 | 0.79 | 12.482 | 13 | − | ------ |
| 80 | 0.80 | 12.860 | 12 | + | ------ |
| 81 | 0.81 | 13.122 | 13 | + | ------ |
| 82 | 0.82 | 13.448 | 14 | − | ------ |
| 83 | 0.83 | 13.778 | 13 | + | ------ |
| 84 | 0.84 | 14.112 | 14 | + | ------ |
| 85 | 0.85 | 14.450 | 15 | − | ------ |
| 86 | 0.86 | 14.792 | 14 | + | ------ |
| 87 | 0.87 | 15.178 | 15 | + | ------ |
| 88 | 0.88 | 15.488 | 16 | − | ------ |
| 89 | 0.89 | 15.842 | 15 | + | ------ |
| 90 | 0.90 | 16.200 | 16 | + | ------ |
| 91 | 0.91 | 16.562 | 17 | − | ------ |
| 92 | 0.92 | 16.928 | 16 | + | ------ |
| 93 | 0.93 | 17.298 | 17 | + | ------ |
| 94 | 0.94 | 17.672 | 18 | − | ------ |
| 95 | 0.95 | 18.050 | 17 | + | ------ |
| 96 | 0.96 | 18.432 | 18 | + | ------ |
| 97 | 0.97 | 18.818 | 19 | − | ------ |
| 98 | 0.98 | 19.208 | 18 | + | ------ |
| 99 | 0.99 | 19.602 | 19 | + | ------ |
| 100 | 1.00 | 20.000 | 20 | + | + |
| 101 | 1.01 | 20.402 | 21 | − | − |
| 102 | 1.02 | 20.808 | 20 | + | + |
| 103 | 1.03 | 21.218 | 21 | + | + |
| 104 | 1.04 | 21.632 | 22 | − | − |
| 105 | 1.05 | 22.050 | 21 | + | + |
| 106 | 1.06 | 22.472 | 22 | + | − |
| 107 | 1.07 | 22.898 | 23 | − | + |
| 108 | 1.08 | 23.328 | 22 | + | − |
| 109 | 1.09 | 23.762 | 23 | + | + |
| 110 | 1.10 | 24.200 | 24 | + | + |
| 111 | 1.11 | 24.642 | 25 | − | − |
| 112 | 1.12 | 25.088 | 24 | + | + |
| 113 | 1.13 | 25.538 | 25 | + | + |
| 114 | 1.14 | 25.992 | 26 | − | − |
| 115 | 1.15 | 26.450 | 25 | + | + |
| 116 | 1.16 | 26.912 | 26 | + | − |
| 117 | 1.17 | 27.378 | 27 | + | + |
| 118 | 1.18 | 27.848 | 28 | − | − |
| 119 | 1.19 | 28.322 | 27 | + | + |
| 120 | 1.20 | 28.800 | 28 | + | + |
| 121 | 1.21 | 29.282 | 29 | + | + |
| 122 | 1.22 | 29.768 | 30 | − | − |
| 123 | 1.23 | 30.258 | 29 | + | − |
| 124 | 1.24 | 30.752 | 30 | + | + |
| 125 | 1.25 | 31.250 | 31 | + | + |
| 126 | 1.26 | 31.752 | 32 | − | − |
| 127 | 1.27 | 32.258 | 31 | + | + |
| 128 | 1.28 | 32.768 | 32 | + | + |
| 129 | 1.29 | 33.282 | 33 | + | − |
| 130 | 1.30 | 33.800 | 34 | − | + |
| 131 | 1.31 | 34.322 | 33 | + | − |
| 132 | 1.32 | 34.848 | 34 | + | + |
| 133 | 1.33 | 35.378 | 35 | + | + |
| 134 | 1.34 | 35.912 | 36 | − | − |
| 135 | 1.35 | 36.450 | 35 | + | + |
| 136 | 1.36 | 36.992 | 36 | + | − |
| 137 | 1.37 | 37.532 | 37 | + | + |
| 138 | 1.38 | 38.088 | 38 | + | + |
| 139 | 1.39 | 38.642 | 39 | − | − |
| 140 | 1.40 | 39.200 | 38 | + | + |
| 141 | 1.41 | 39.762 | 39 | + | − |
| 142 | 1.42 | 40.328 | 40 | + | + |
| 143 | 1.43 | 40.898 | 41 | − | − |
| 144 | 1.44 | 41.472 | 40 | + | + |
| 145 | 1.45 | 42.050 | 41 | + | + |
| 146 | 1.46 | 42.632 | 42 | + | − |
| 147 | 1.47 | 43.218 | 43 | + | + |
| 148 | 1.48 | 43.808 | 44 | − | − |
| 149 | 1.49 | 44.402 | 43 | + | + |
| 150 | 1.50 | 45.000 | 44 | + | + |
| 151 | 1.51 | 45.602 | 45 | + | − |
| 152 | 1.52 | 46.208 | 46 | + | + |
| 153 | 1.53 | 46.818 | 47 | − | − |
| 154 | 1.54 | 47.432 | 46 | + | + |
| 155 | 1.55 | 48.050 | 47 | + | + |
| 156 | 1.56 | 48.622 | 48 | + | − |
| 157 | 1.57 | 49.298 | 49 | + | + |
| 158 | 1.58 | 49.928 | 50 | − | − |
| 159 | 1.59 | 50.562 | 49 | + | + |
| 160 | 1.60 | 51.200 | 50 | + | + |
| 161 | 1.61 | 51.842 | 51 | + | − |
| 162 | 1.62 | 52.488 | 52 | + | + |
| 163 | 1.63 | 53.138 | 53 | + | + |
| 164 | 1.64 | 53.792 | 54 | − | − |
| 165 | 1.65 | 54.450 | 53 | + | + |
| 166 | 1.66 | 55.112 | 54 | + | − |
| 167 | 1.67 | 55.778 | 55 | + | + |
| 168 | 1.68 | 56.448 | 56 | + | + |
| 169 | 1.69 | 57.122 | 57 | + | − |
| 170 | 1.70 | 57.800 | 58 | − | + |
| 171 | 1.71 | 58.482 | 57 | + | − |
| 172 | 1.72 | 59.168 | 58 | + | + |
| 173 | 1.73 | 59.858 | 59 | + | + |
| 174 | 1.74 | 60.552 | 60 | + | − |
| 175 | 1.75 | 61.250 | 61 | + | + |
| 176 | 1.76 | 61.952 | 62 | − | − |
| 177 | 1.77 | 62.658 | 61 | + | + |
| 178 | 1.78 | 63.368 | 62 | + | − |
| 179 | 1.79 | 64.082 | 63 | + | + |
| 180 | 1.80 | 64.800 | 64 | + | + |
| 181 | 1.81 | 65.522 | 65 | + | − |
| 182 | 1.82 | 66.248 | 66 | + | + |
| 183 | 1.83 | 66.978 | 67 | − | − |
| 184 | 1.84 | 67.712 | 66 | + | + |
| 185 | 1.85 | 68.450 | 67 | + | + |
| 186 | 1.86 | 69.192 | 68 | + | − |
| 187 | 1.87 | 69.938 | 69 | + | + |
| 188 | 1.88 | 70.688 | 70 | + | + |
| 189 | 1.89 | 71.442 | 71 | + | − |
| 190 | 1.90 | 72.200 | 72 | + | + |
| 191 | 1.91 | 72.962 | 73 | − | − |
| 192 | 1.92 | 73.728 | 72 | + | + |
| 193 | 1.93 | 74.498 | 73 | + | − |
| 194 | 1.94 | 75.272 | 74 | + | + |
| 195 | 1.95 | 76.050 | 75 | + | + |
| 196 | 1.96 | 76.832 | 76 | + | − |
| 197 | 1.97 | 77.618 | 77 | + | + |
| 198 | 1.98 | 78.408 | 78 | + | + |
| 199 | 1.99 | 79.202 | 79 | + | − |
| 200 | 2.00 | 80.000 | 80 | + | + |
| 201 | 2.01 | 80.802 | 81 | − | − |
| 202 | 2.02 | 81.608 | 80 | + | + |
| 203 | 2.03 | 82.418 | 81 | + | − |
| 204 | 2.04 | 83.232 | 82 | + | + |
| 205 | 2.05 | 84.050 | 83 | + | + |
| 206 | 2.06 | 84.872 | 84 | + | − |
| 207 | 2.07 | 85.698 | 85 | + | + |
| 208 | 2.08 | 86.528 | 86 | + | + |
| 209 | 2.09 | 87.362 | 87 | + | − |
| 210 | 2.10 | 88.200 | 88 | + | + |
| 211 | 2.11 | 89.042 | 89 | + | + |
| 212 | 2.12 | 89.888 | 90 | − | − |
| 213 | 2.13 | 90.738 | 89 | + | − |
| 214 | 2.14 | 91.592 | 90 | + | + |
| 215 | 2.15 | 92.450 | 91 | + | + |
| 216 | 2.16 | 93.312 | 92 | + | − |
| 217 | 2.17 | 94.178 | 93 | + | + |
| 218 | 2.18 | 95.048 | 94 | + | + |
| 219 | 2.19 | 95.972 | 95 | + | − |
| 220 | 2.20 | 96.800 | 96 | + | + |
| 221 | 2.21 | 97.682 | 97 | + | − |
| 222 | 2.22 | 98.568 | 98 | + | + |
| 223 | 2.23 | 99.458 | 99 | + | + |
| 224 | 2.24 | 100.352 | 100 | + | − |

In the column entitled $d_n$ of Table I, above presented, each plus (+) entry indicates that the corresponding signal $d_n$ is a +1 representing signal, while each minus (—) entry indicates that the corresponding signal $d_n$ is a —1 representing signal. It will be noted that in Table I at the entry $n$=100 an additional column is provided entitled $D_n=d_n-d_{n-p}$ the entries in this additional column being + or — entries indicating +1 or —1 values for signals $D_n$ where the value of $D_n$ is equal, as hereinbefore indicated, to the difference of the values of signals $d_n$ and $d_{n-p}$.

If it be assumed that $p=100$, then as explained hereinbefore in connection with FIG. 1, when successive signalss $d_0$, $d_1$, $d_2$, . . . $d_{244}$ of signal train $\not{D}_U$ are applied to differentiating aparatus 10, shown in FIG. 1, delay element 14 operates to delay signal $d_0$ until signal $d_{100}$ is applied thereto, delay element 14 then applying the delayed signal $d_0$ to one input of signal combining circuit 16 while at the same time combining circuit 16 also receives the presently applied signal $d_{100}$. Combining circuit 16 then functions to combine the bivalued signals $d_0$ and $d_{100}$ to produce a resultant output signal $D_{100}$ representing the difference of signals $d_0$ and $d_{100}$. In the same manner in subsequent signal periods combining circuit 16 receives and combines the signal pairs $d_1$ and $d_{101}$, $d_2$ and $d_{102}$, $d_3$ and $d_{103}$, . . . to produce respectively corresponding output signals $D_{101}$, $D_{102}$, $D_{103}$, . . . which respectively represent the differences of the values of the associated signal pairs. In Table I therefore the values of these output signals $D_{100}$, $D_{101}$, $D_{102}$, $D_{103}$, . . . are tabulated, for the present example, according to one scheme for obtaining the difference of the values of the pairs of difunction signals.

It will be remembered that in the present example signals having +1 or —1 values are utilized in the input difunction signal train $\not{D}_U$. A number of basically similar methods may be utilized for finding the difference in values of such +1 and —1 representing signals. Some of these methods are summarized in the following Table II.

*Table II*

| $d_n$ | $d_{n-p}$ | $D_n=d_n-d_{n-p}$ | | |
|---|---|---|---|---|
| | | Method 1 | Method 2 | Method 3 |
| +1 | —1 | +2 | +1 | +1. |
| +1 | +1 | 0 | 0 | alternate +1 and —1 values. |
| —1 | —1 | 0 | 0 | assigned for each 0 value. |
| —1 | +1 | —2 | —1 | —1. |

In Table II all the four possible combinations of +1 and —1 values of signals $d_n$ and $d_{n-p}$ are tabulated. According to the most obvious method, method 1, for obtaining the difference of the values of signals $d_n$ and $d_{n-p}$ the subtraction of a +1 value from a +1 value produces a 0 value and similarly, the subtraction of a —1 from a —1 value also produces a 0 value. The subtraction of a —1 value from a +1 value produces a +2 value, while the subtraction of a +1 value from a —1 value produces a —2 value. If signal combining circuit 16 functioned in accordance with method 1 the output signals $D_n$ produced by signal combining circuit 16 would therefore be tri-valued signals representing the values 0, +2, —2.

An embodiment of signal combining circuit 16 mechanized in accordance with method 1 could be readily devised. However, it is desirable in a computing instrument to have output signals from any circuit compatible or of like nature with the input signals to the circuit so that further operations may be performed without attention to any change or varied nature of the signals. One step in this direction may be taken by utilizing another method, method 2, for the subtraction of +1 and —1 values, as illustrated in Table II. In this method each +2 difference (as found by method 1) is arbitrarily designated as a +1 while each —2 difference is arbitrarily designated as —1, 0 values remaining unchanged. In method 2, since each true +2 value is replaced by a +1 and each true —2 value is replaced by a —1, it is clear that the average value of a sequence of signals $D_n$ generated in accordance with method 2 will be equal to one-half the average value obtained with the use of method 1. As in method 1 each output signal $D_n$ would be a tri-valued output signal, having in this instance possible values of +1, 0, or —1. Still a further step may be taken in rendering the form of output signals $D_n$ compatible with the form of input signals $d_n$ by utilizing a third method, method 3, in which alternate +1 and —1 values are assigned to each 0 value (as obtained by method 2). These alternate +1's and —1's cancel each other to 0 values, and therefore, produce no change in the average value of the output signal train. On the other hand, a considerable advantage in signal conformity is gained in that the signals $D_n$ produced by signal combining circuit 16 are then bivalued signals representing +1 or —1, these signals being completely compatible with the input signals $d_n$. It is this third method, method 3, which has been utilized in Table I in the tabulation of the values of signals $D_{100}$ through $D_{224}$.

The manner in which method 3 is applied in finding the values of signals D, as listed in Table I will be clarified by a consideration of a brief numerical example in which it will be verified that the values of signals $D_{100}$ . . . $D_{109}$ as listed in Table I correspond to the difference in value in accordance with method 3 of signals $d_{100}$ . . . $d_{109}$ and $d_0$ . . . $d_9$, respectively.

*Table III*

| $d_n$ | $p=100$ $d_{n-p}$ | (Method 3) $D_n=d_n-d_{n-p}$ |
|---|---|---|
| $d_{100}=+1$ | $d_0=+1$ | $D_{100}=+1$ |
| $d_{101}=-1$ | $d_1=-1$ | $D_{101}=-1$ |
| $d_{102}=+1$ | $d_2=+1$ | $D_{102}=+1$ |
| $d_{103}=+1$ | $d_3=-1$ | $D_{103}=+1$ |
| $d_{104}=-1$ | $d_4=+1$ | $D_{104}=-1$ |
| $d_{105}=+1$ | $d_5=-1$ | $D_{105}=+1$ |
| $d_{106}=+1$ | $d_6=+1$ | $D_{106}=-1$ |
| $d_{107}=-1$ | $d_7=-1$ | $D_{017}=+1$ |
| $d_{108}=+1$ | $d_8=+1$ | $D_{108}=-1$ |
| $d_{109}=+1$ | $d_9=-1$ | $D_{109}=+1$ |
| $\frac{\sum_{n=100}^{109} d_n}{10}=\frac{4}{10}$ | $\frac{\sum_{n=100}^{109} d_n}{10}=0$ | $\frac{\sum_{n=100}^{109} d_n}{10}=\frac{2}{10}$ |

As shown in Table III, signals $d_{100}$ and $d_0$ both have +1 values and therefore their true difference of value is zero. Similarly signals $d_{101}$ and $d_1$ both have —1 values and therefore also have a difference in value of zero. However, in accordance with method 3, these zero values are assigned alternate +1 and —1 and therefore signal $D_{100}$ is assigned a +1 value while signal $D_{101}$ is assigned a —1 value. In the same manner signals $D_{102}$ and $D_{106}$–$D_{108}$ are assigned alternate +1 and —1 values, these values being encircled in Table III to indicate that they arise through alternation of zero values.

It will also be noted that signal $d_{103}$ has a +1 value while signal $d_3$ has a —1 value, their true difference in value being +2. In accordance with method 3, therefore, signal $D_{103}$ is assigned a +1 value. In the same manner signal $D_{105}$ is assigned a +1 value. However signals $d_{104}$ and $d_4$ have a true difference of —2 and therefore in accordance with method 3 signal $D_{104}$ is assigned a —1 value. Since in assigning values to signals $D_n$, true +2 and —2 values were replaced by +1 and —1 values, respectively, it would be expected as hereinbefore indicated that the average value of signals $D_{100}$ through $D_{109}$ would be equal to one half the difference of the average values of signals $d_{100}$ through $d_{109}$ and $d_0$ through $d_9$ respectively. This expectation is indeed correct. As indicated in Table III the average value of the 10 signals $d_{100}$ through $d_{109}$ is $4/10$ while the average value of signals $d_0$ through $d_9$ is 0, the difference of these average values being $4/10$. As indicated in Table III, the average value of signals $D_{100}$ through $D_{109}$ is equal to one-half this difference or $\frac{2}{10}$.

It is believed that a full enough explanation has now been provided of the manner in which varying quantities may be represented by a difunction signal train and of the manner of differencing difunction signals to permit understanding of the following mathematical development of general formulas proving that in the operation of differentiating apparatus 10 shown in FIG. 1, the train of output signals $D_n$ is representative of the rate of change of the quantity U represented by the applied train of difunction input signals $d_n$. Moreover, it will be shown, by appropriate substitution of values in these general formulas, that when the particular hereinbefore derived difunction signal train $\mathcal{D}_U$ $(U=.4x)$ is applied to differentiating apparatus 10, the resultant output train of signals $D_n$ (as listed in Table I) represents a fixed quantity proportional to $$\frac{dU}{dx}=.4$$

Effectively, what is required is a formula for the average value of the output signals $D_n$ over the interval of $x$ from $x=m.\Delta x$ to $x=m+h.\Delta x$. What is required therefore is an evaluation of the expression:

$$\frac{\sum_{n=m+1}^{m+h} D_n}{h} \quad (19)$$

Since $D_n=d_n-d_{n\text{-}p}$, it may be stated that:

$$\frac{\sum_{n=m+1}^{m+h} D_n}{h}=\frac{\sum_{n=m+1}^{m+h} d_n-d_{n\text{-}p}}{h} \quad (20a)$$

If it is assumed that values of $D_n$ are found from values of $d_n$ and $d_{n\text{-}p}$, by differencing in accordance with methods 2 or 3, then the righthand side of Equation 20*a* must be multiplied by a factor of ½ to produce the equation:

$$\frac{\sum_{n=m+1}^{m+h} D_n}{h}=\frac{\sum_{n=m+1}^{m+h} d_n-d_{n\text{-}p}}{h} \quad (20b)$$

Expanding, the righthand term of Equation 20*b* there is obtained the following:

$$\frac{\sum_{n=m+1}^{m+h} D_n}{h}=\frac{1}{2}\left[\frac{\sum_{n=m+1}^{m+h} d_n}{h}-\frac{\sum_{n=m+1}^{m+h} d_{n\text{-}p}}{h}\right] \quad (21)$$

However the first term within the brackets of the righthand side of Equation 21 has already been evaluated hereinbefore in Formula 9:

$$\frac{\sum_{n=m+1}^{m+h} d_n}{h}\cong\Delta x.\left(\frac{dy}{dx}\right)_{m+\frac{h}{2}}+\frac{2\epsilon}{h} \quad (9)$$

And moreover through analogy, by application of Formula 9 the second term within brackets of the righthand side of Formula 21 may also be evaluated:

$$\frac{\sum_{n=m+1}^{m+h} d_{n\text{-}p}}{h}\cong\Delta x\left(\frac{dy}{dx}\right)_{m-p+\frac{h}{2}}+\frac{2\epsilon}{h} \quad (22)$$

Substituting Formulas 9 and 22 into Equation 21 and remembering that $\epsilon$ is a quantity of indeterminate magnitude lying between +1 and −1, there is obtained the following Formula 23

$$\frac{\sum_{n=m+1}^{m+h} D_n}{h}\cong\frac{\Delta x}{2}\left[\left(\frac{dy}{dx}\right)_{m+\frac{h}{2}}-\left(\frac{dy}{dx}\right)_{m-p+\frac{h}{2}}\right]+\frac{2\epsilon}{h} \quad (23)$$

Transforming one term of Formula 23 by multiplying and dividing by $p.\Delta x$, there is obtained $$\frac{\sum_{n=m+1}^{m+h} D_n}{h}\cong\frac{p.\Delta x^2}{2}\left[\frac{\left(\frac{dy}{dx}\right)_{m+\frac{h}{2}}-\left(\frac{dy}{dx}\right)_{m-p+\frac{h}{2}}}{p.\Delta x}\right]+\frac{2\epsilon}{h} \quad (24)$$

Formula 24 may be reduced by recognizing that the expression in the brackets is the average rate of change with respect to $x$ of $dy/dx$ over the interval $$x=\left(m+\frac{h}{2}\right)\cdot\Delta x \text{ to } x=\left(m-p+\frac{h}{2}\right)\cdot\Delta x$$

and therefore the expression in brackets may be replaced to a first order of approximation by $$\frac{d}{dx}\left(\frac{dy}{dx}\right)_{m-\frac{p}{2}+\frac{h}{2}}$$

the instantaneous rate of change of $dy/dx$ with respect to $x$ as evaluated at the midpoint of the interval.

$$\frac{\sum_{n=m=1}^{m+h} D_n}{h}\cong\frac{p.\Delta x^2}{2}\left[\frac{d}{dx}\left(\frac{dy}{dx}\right)_{m-\frac{p}{2}+\frac{h}{2}}\right]+\frac{2\epsilon}{h} \quad (25)$$

Formula 25 may be rewritten in the following equivalent form:

$$\frac{\sum_{n=m+1}^{m+h} D_n}{h}\cong\frac{p.\Delta x}{2}\left[\frac{d}{dx}\left(\Delta x.\frac{dy}{dx}\right)_{m-\frac{p}{2}+\frac{h}{2}}\right]+\frac{2\epsilon}{h} \quad (26)$$

And, since it has been shown that $$U=\Delta x.\frac{dy}{dx}$$

Formula 26 in turn may be rewritten in the form:

$$\frac{\sum_{n=m+1}^{m+h} D_n}{h}\cong\frac{p.\Delta x}{2}\left[\left(\frac{dU}{dx}\right)_{m-\frac{p}{2}+\frac{h}{2}}\right]+\frac{2\epsilon}{h} \quad (27)$$

Thus in Formula 27 the required evaluation of the average value of any sequence of $h$ output signals $D_n$ over any corresponding interval in $x$ from $x=m\Delta x$ to $x=(m+h)\Delta x$ has been obtained. It also has been shown that this value is approximately equal to a constant $$\left(\frac{p.\Delta x}{2}\right) \text{ times } \frac{dU}{dx}$$

the rate of change of U with respect to $x$ as evaluated at the point $$x=\left(m-\frac{p}{2}+\frac{h}{2}\right)\Delta x$$

with a maximum expected error of approximately $\pm 2/h$.

It is of some interest to substitute appropriate values in general Formula 27 to discover what quantity must be represented by the train of output signals $D_{100}$ through $D_{224}$ (whose values are listed in Table I) produced in the present example by the application of the signals $d_n$ of signal train $\mathcal{D}_U$ (where $U=.4x$) to differentiating apparatus 10 shown in FIG. 1.

In the present example $U=.4x$ and $p=100$ while $\Delta x=.01$. The quantity $dU/dx$ is clearly equal to a constant value of .4. Substituting in Formula 27 there is obtained:

$$\frac{\sum_{n=m+1}^{m+h} D_{n+1}}{h}=\frac{100(.01)}{2}[.4]+\frac{2\epsilon}{h}=.2+\frac{2\epsilon}{h} \quad (27a)$$

Thus, according to Formula 27*a*, in the present example the signals $D_n$ whose values are listed in Table I form a signal train which has a constant value of .2 with a maximum error of $\pm 2/h$ where $h$ is the number of signals over which the average is extended. Thus the average signal value in any section of the train of signals $D_{100}$ through $D_{224}$ should approximate the value .2 within the stated limits of error. That this result is indeed obtained may be directly verified by considering the list of values of signals $D_n$ provided in Table I.

For example, consider first the signals $D_{100}$ to $D_{199}$. In this sequence of 100 signals there are sixty +1 representing signals and forty −1 representing signals. The average value of signals in this sequence is therefore $$\frac{60-40}{100} \text{ or } .2$$

At the beginning of the signal train in the fifty signals from $D_{100}$ to $D_{149}$ there are thirty +1 signals and twenty −1 signals, giving an average value of $$\frac{30-20}{50} \text{ or } .2$$

for this sequence of signals. Similarly at a later point in the signal train for the fifty signals from $D_{150}$ to $D_{199}$ there are thirty +1 signals and twenty −1 signals again giving an average value of $$\frac{30-20}{50} \text{ or } .2$$

Considering a shorter signal sequence, an average over the 10 signals $D_{119}$ to $D_{128}$ gives an average value of $$\frac{7-3}{10} \text{ or } .4$$

there being an error of .2 in the average over this signal sequence. However, since the maximum expected error is of the order of $$\frac{\pm 2}{h} = .2$$

such a result for a shorter sequence is hardly unexpected and merely demonstrates that it is advisable to average over longer signal sequences in evaluating the output difunction signal train. If, for example, assured accuracy of one part in fifty is desired it may be obtained by averaging over one hundred signals $D_n$ of the output signal train.

Referring now to FIG. 3, there is shown a preferred embodiment of differentiating apparatus 10 according to the present invention in which delay element 14 is seen to comprise a conventional magnetic recording and playback unit including a rotatable magnetic drum 30, three magnetic transducers 31, 32 and 33, a recording circuit 35 coupled to transducer 31, a playback circuit 37 coupled to transducer 32, and a timing signal generating circuit 39 coupled to transducer 33. Signal combining circuit 16 is seen to comprise a pair of inverting amplifiers 40 and 41 and a difunction subtractor 42 of the type fully disclosed in connection with FIG. 7*a* of U.S. Patent No. 2,898,040, for "Computer and Indicator System," to the same inventor, issued August 4, 1959.

As illustrated in FIG. 3, magnetic transducer 31 is positioned adjacent a magnetizable channel 50 established on the periphery of drum 30, transducer 31 functioning to record a magnetic signal upon the portion of channel 50 immediately below transducer 31 whenever an electrical signal is applied to the transducer by recording circuit 35. By reason of rotation of drum 30 any signals recorded by transducer 31 will be transported to transducer 32 which as illustrated in FIG. 3 is positioned adjacent channel 50 at a point remote from and at a predetermined spacing from transducer 31. As such transported signals pass beneath transducer 32, they induce corresponding bilevel electrical signals in a winding of the transducer which as shown in FIG. 3 is connected to playback circuit 37. Playback circuit 37 functions to amplify and reshape these electrical signals to a form suitable for application to signal combining circuit 16, these amplified and reshaped signals being applied as shown in FIG. 3 to an input conductor 45 of signal combining unit 16.

Drum 30 as shown in FIG. 3 is also provided with an additional peripherally disposed channel 51 on which are permanently recorded a large plurality of timing marks evenly distributed at equal angular spacings or increments about the periphery of drum 30. As illustrated in FIG. 3, transducer 33 which is coupled to timing signal generating circuit 39 is positioned adjacent track 51. Upon rotation of drum 30, each passage of a timing mark beneath transducer 33 induces in a winding of the transducer a corresponding voltage signal which is applied to timing signal generating circuit 39, circuit 39 responding to each applied voltage signal by immediately producing an amplified and reshaped timing signal.

It may be said, therefore, that timing signal generating circuit 39, will, in response to rotation of drum 30, produce a timing signal each time that drum 30 rotates through a predetermined angular increment corresponding to the spacing between timing signals recorded on channel 51. Restating this in a different manner, if the angular displacement of drum 30 is designated by the symbol $x$ and the spacing between timing marks on track 51 is designated by the symbol $\Delta x$, then it may be said that generating circuit 39 produces a timing signal each time that the angular displacement $x$ of drum 30 increases by the predetermined increment $\Delta x$.

These timing signals produced by generating circuit 39 are utilized for synchronization of all operations connected with the embodiment of differentiating apparatus 10 shown in FIG. 3. Timing signals produced by circuit 39 are applied over conductors shown in FIG. 3 to playback circuit 37, difunction subtractor 42, recording circuit 35 and are also applied externally to the source (not shown) of the applied difunction signal train to synchronize the production of successive difunction signals. It will be understood that the source of difunction signals (as for example, an angular quantizer) responds to each application of a timing signal by producing and applying to differentiating apparatus 10, a new bivalued signal, designated $d_n$ of a difunction signal train representing a varying quantity. Thus a new difunction signal $d_n$ is applied to differentiating apparatus 10 each time that the angular displacement $x$ of drum 30 increases by the predetermined increment $\Delta x$.

As illustrated in FIG. 3 each signal $d_n$ presented to differentiating apparatus 10 is directly applied to an input terminal of recording circuit 35 and is also applied to an input conductor 46 of signal combining unit 16. Recording circuit 35 receives each signal $d_n$ applied to its input terminal and in response thereto actuates its associated transducer 31 to record the signal upon information channel 50. The instant at which recording of a signal begins is controlled or synchronized by the corresponding timing signal applied to recording circuit 35 so that in operation each signal $d_n$ is recorded upon track 50 at the same time that a timing signal is produced by generating circuit 39.

As explained hereinbefore each recorded signal is then transported by reason of rotation of drum 30 to playback transducer 37 which as stated hereinbefore is at a predetermined spacing from recording transducer 31. This spacing is established at a predetermined integral multiple I of the spacing $\Delta x$ between the timing marks recorded on channel 51. As a result of this choice of spacing while a signal $d_n$ is delayed by being transported from transducer 31 to transducer 32, exactly I timing signals will be produced by generating circuit 39 during this time and therefore during this interval exactly I additional signals will be produced by the source of difunction signals and applied to differentiating apparatus 10, the $I^{th}$ additional signal being applied to recording circuit 35 at the same time that the corresponding delayed signal is picked up by transducer 32 and applied to playback circuit 37.

If it is assumed that no signal delay is introduced by recording circuit 35 and playback circuit 37 then it is clear that the total delay encountered by an applied signal $d_n$ in passing from the input conductor of delay element 14 to conductor 45 will be exactly equal to the time required for the angular displacement $x$ of drum 30 to increase by an amount $I.\Delta x$. During this time I additional signals will be applied to delay element 14 the I$^{th}$ later occurring signal being applied to the input conductor at the same time that the corresponding delayed signal is applied to conductor 45. Thus if a particular integral delay of $p$ signal times is desired, this can be readily obtained by letting $I=p$, that is by setting the spacing between transducers 31 and 32 at a distance of $p.\Delta x$. However, those skilled in the magnetic recording art will recognize that in a conventional magnetic recording and playback apparatus, recording circuit 35 and playback circuit 37 will each introduce time delays which must be considered in determining spacing I$\Delta x$. For example, if each circuit introduces a unit signal time delay, to obtain an overall delay in delay element 14 of $p$ signal times, the spacing between transducers 31 and 32 will be established at a distance $(p-2)\Delta x$ (thus in this instance $I=p-2$).

It is clear in view of the foregoing explanation of the structure and operations of delay element 14, that in overall operation each time that a presently occurring signal $d_n$ is applied to the input conductor of element 14, element 14 will function to apply the $p^{th}$ earlier occurring signal (designated $d_{n-p}$) to conductor 45. Since each presently occurring signal $d_n$ is also applied to input conductor 46 of signal combining unit 16, in operation unit 16 receives in successive signal times, pairs of difunction signals $d_n$ and $d_{n-p}$ simultaneously applied over input conductors 45 and 46, respectively.

As illustrated in FIG. 3, each signal $d_n$ applied to conductor 46 is presented to a first input terminal of difunction subtracter 42 and is also applied to an input of inverting amplifier 40 which applies a corresponding inverted or complemented signal $\bar{d}_n$ to a second input terminal of subtracter 42.

Each signal $d_{n-p}$ applied to conductor 45 is directly presented to a third input terminal of difunction subtracter 42 and is also applied to inverting amplifier 41 which applies a corresponding inverted or complementary signal $\bar{d}_{n-p}$ to a fourth input terminal of subtracter 42. In operation difunction subtracter 42 responds to simultaneous application of signals $d_n$, $\bar{d}_n$, $d_{n-p}$, $\bar{d}_{n-p}$, and the corresponding timing signal from signal generating circuit 39 to produce a resultant output signal designated $D_n$ which represents the difference of the applied input signals $d_n$ and $d_{n-p}$. This difference is obtained in accordance with method 3 hereinbefore explained. In other words, difunction subtracter 42 functions to produce an output signal having the same value as signal $\bar{d}_n$ whenever signals $d_n$ and $d_{n-p}$ have different values and to produce alternately valued signals each time that applied signals $d_n$ and $d_{n-p}$ have the same value. It is not believed necessary in the present specification to explain in detail the structure and internal operation of difunction subtracter 42 since these details are fully disclosed in the aforementioned U.S. Patent No. 2,898,040, of the present inventor.

The train of successive output signals $D_n$ produced by difunction subtracter 42 is the required signal train representing the rate of change of the quantity represented by the applied input train of signals $d_n$. If the varying quantity represented by the input signal train is designated U, then, in view of the foregoing explanation of the operation of a differentiating apparatus according to the invention it is clear that the resultant output signal train of signals $D_n$ represents a quantity proportional to $dU/dx$, the rate of change of the varying quantity U with respect to the angular displacement $x$ of drum 30.

It will be understood that if it is desired to differentiate the quantity U with respect to time, this may readily be accomplished by rotating drum 30 at a constant or uniform velocity. In this event each increment $\Delta x$ in the angular displacement of drum 30 corresponds exactly to a definite fixed increment $\Delta t$ in time, while the magnitude $x$ of the angular displacement of the drum corresponds in magnitude to the present value of time, designated $t$. Since there is thus established a one-to-one correspondence between the angular displacement $x$ of the drum and the magnitude of present time $t$, it is clear that under these conditions the train of output signals $D_n$ produced by the embodiment of differentiating apparatus 10 shown in FIG. 3 represents a quantity proportional to $dU/dt$. In this type of operation of differentiating apparatus 10 shown in FIG. 3, the delay encountered by each signal $d_n$ applied to delay element 14 will be a fixed or constant time delay.

It should be understood of course that the foregoing disclosure relates only to preferred embodiments of the invention and that numerous alterations and modifications can be made therein without departing from the spirit and scope of the invention. For example, in the preferred embodiment of the invention shown in FIG. 3, signal combining unit 16 has been described as being essentially a signal subtraction unit which receives signals $d_n$ and $d_{n-p}$ to form a resultant difference signal $D_n=d_n-d_{n-p}$. However, those skilled in the art will readily recognize that playback circuit 37 shown in FIG. 3 may be constructed so that it produces an inverted output signal $\bar{d}_{n-p}$ rather than the direct signals $d_{n-p}$. Such an inversion of signals $d_{n-p}$ corresponds in a difunction signal train to change of sign of the signals (since each $+1$ signal is replaced by a $-1$ signal and each $-1$ signal is replaced with a $+1$ signal) and therefore the signals applied to signal combining unit 16 could be designated as $d_n-d_{n-p}$. Clearly, in this event a difunction adder rather than a difunction subtracter would be utilized to produce the desired resultant output signal $D_n=d_n-d_{n-p}$. A difunction adder suitable for this application is fully disclosed in the aforementioned U.S. Patent No. 2,898,040.

Those skilled in the art also will recognize that the method of differentiation of a difunction signal train disclosed in the present application is of such broad and general utility that it may readily be mechanized by many widely varying physical embodiments. For example, it will be clear to one skilled in the art that the magnetic memory embodiment of delay element 14 shown in FIG. 3 may be replaced by another, very different, but well known type of storage and delay device, namely, an electronic shift register composed of $p$ serially connected electronic flip-flop stages.

In a shift register of this type, bivalued electrical signals $d_n$ may be stored by applying each signal to selectively set the state of an input flip-flop of the serially connected flip-flop stages, the electronic state of each flip-flop stage being transferred or shifted to the successive flip-flop stage at each successive application of additional bivalued signals $d_n$. Thus in the operation of such a $p$ stage shift register, at the same time that a presently occurring signal $d_n$ is applied to the input stage the $p^{th}$ precedingly applied signal $d_{n-p}$ will be presented at an output terminal of the last or $p^{th}$ stage of the shift register. The shift register thus functions as an asynchronous delay device which introduces a $p$ signal time delay which is independent of the rate of occurrence of the applied input signals.

Since, in accordance with the method of the present invention, the overall function of delay element 14 is merely to store each applied signal $d_n$ and to present each signal thus stored at an output terminal at the same time the $p^{th}$ later occurring signal is applied to an input terminal, it will be clear to those skilled in the art that many other types of memory devices now known in the art may be utilized to perform this required function. For example where a fixed delay is desired, as when differentiation is accomplished with respect to time, a wide variety of fixed time delay storage devices may be utilized such as mercury acoustic memory tubes and distributed or lumped constant electromagnetic delay lines.

Still other modifications, additions and alterations to the present invention may be practiced by those skilled in the art without departing from the spirit and scope of the invention as defined in the appended claims.

What is claimed as new is:

1. A difunction differentiating apparatus for operating upon successively applied bivalued electrical signals of an input difunction signal train non-numerically representing a varying quantity to produce a resultant signal train non-numerically representative of the rate of change of the varying quantity, said difunction differentiating apparatus comprising: a delay element having an input terminal and an output terminal and operable for receiving each of the successively applied signals of said difunction signal train at said input terminal and for presenting each received signal at said output terminal at the same time that the corresponding $p^{th}$ later applied signal is received at said input terminal, where $p$ is a predetermined integer greater than two, and a signal combining unit connected to said input terminal and to said output terminal for combining each signal presented at said output terminal with the corresponding $p^{th}$ later signal being applied at said input terminal to produce a resultant signal representative of the difference in value of the corresponding pair of signals, whereby the successive resultant signals produced by said signal combining unit comprise the resultant signal train representing the rate of change of the varying quantity.

2. The differentiating apparatus defined by claim 1 wherein said signal combining unit includes a difunction substractor circuit coupled to said input terminal and to said output terminal for combining each pair of signals simultaneously presented at said terminals to form a resultant bivalued output signal representative of the difunction difference in value of the pair of signals, the successive bivalued output signals thereby produced comprising a difunction signal train non-numerically representative of the rate of change of the varying quantity.

3. A difunction differentiating apparatus for operating upon sequentially applied bivalued electrical signals of a difunction input signal train non-numerically representing a varying quantity, said differentiating apparatus comprising: delay means receiving each applied signal and operable for delaying each applied signal until $p$ additional signals are applied thereto, where $p$ is a predetermined integer greater than two; and signal combining means for combining each delayed signal with the corresponding $p^{th}$ later applied signal to produce a resultant signal representative of the difference between the values of the delayed signal and the $p^{th}$ later applied signal whereby the successive resultant signals form a resultant signal train non-numerically representative of the rate of change of the varying quantity.

4. A differentiating apparatus for operating upon a series of successively applied fixed period bivalued difunction signals non-numerically representing a varying quantity, said apparatus comprising. delay means for delaying, for a predetermined fixed time interval greater than two of the fixed periods, each signal of said series of signals, and signal combining means for successively combining each delayed signal with a time corresponding later applied signal to produce a series of output signals, each output signal being representative of the difference between a delayed signal and a time corresponding later applied signal, whereby the series of output signals is non-numerically representative of the rate of change of the varying quantity.

5. The differentiating apparatus defined in claim 4 wherein said signal combining means includes a signal subtracting circuit responsive to each delayed signal and the time corresponding later applied signal for producing a resultant bivalued difunction signal representative of the difference between the delayed signal and the time corresponding later applied signal, the successive bivalued output signals thereby produced comprising a difunction signal train non-numerically representative of the rate of change of the varying quantity.

6. A difunction differentiating apparatus for operating upon successively applied bivalued electrical signals $d_n$ of an input difunction signal train non-numerically representing a varying quantity which is a function of an independent variable $x$, where $n$ is a number having successive values of $j$, $j+1$, $j+2$, . . ., each bivalued signal $d_n$ representing either a predetermined first number $N_1$ or a predetermined second number $N_2$ and being applied to the differentiating apparatus when $x=n\Delta x$, where $\Delta x$ is a fixed increment of $x$, said differentiating apparatus comprising: delay means for delaying each applied signal until $x$ has increased by an amount $p\Delta x$, where $p$ is a predetermined integer greater than two to electrically present a delayed signal $d_{n-p}$ when $x=n\Delta x$; and signal combining means for combining signals $d_n$ and $d_{n-p}$ to produce an output difunction signal train comprising a series of bivalued electrical signals $D_n$, each signal $D_n$ being representative of the difference between the numbers represented by signals $d_n$ and $d_{n-p}$, whereby the output signal train thus produced is non-numerically representative of the rate of change with respect to $x$ of the varying quantity.

7. The difunction differentiating apparatus defined by claim 6 wherein said signal combining means includes a difunction subtracter responsive to each pair of signals $d_n$ and $d_{n-p}$ for producing a bivalued signal which has the same value as signal $d_n$ whenever signals $d_n$ and $d_{n-p}$ have different values and having successively alternate values each successive time that signals $d_n$ and $d_{n-p}$ have the same values.

8. The difunction differentiating apparatus defined by claim 6 wherein said independent variable $x$ represents time and $\Delta x$ designates a fixed increment of time, said delay means including apparatus for delaying each applied signal a fixed interval of time $p\Delta x$.

9. A difunction differentiating apparatus for operating upon successively applied bivalued electrical signals $d_n$ of an input difunction signal train non-numerically representing a varying quantity which is a function of a variable $x$, where $n$ is a number having successive values of $j$, $j+1$, $j+2$, . . ., each bivalued signal $d_n$ representing either a predetermined first number $N_1$ or a predetermined second number $N_2$ and being applied to the differentiating apparatus when $x=n\Delta x$, where $\Delta x$ is a fixed increment of $x$, said differentiating apparatus comprising: a delay element responsive to each applied signal for presenting the signal at an output terminal when $x$ has increased by an amount $p\Delta x$ where $p$ is a predetermined integer greater than two; and a subtracter network coupled to said output terminal for combining each delayed signal and a simultaneously applied signal $d_n$ to produce a corresponding output signal $D_n$ representative of the difference between the numbers represented by the delayed signal and the simultaneously applied signal, the successive output signals $D_n$ thereby produced comprising an output signal train non-numerically representative of the rate of change with respect to $x$ of the varying quantity.

10. The differentiating apparatus defined by claim 9 wherein said subtracter network is a difunction subtracter network responsive to each delayed signal and each simultaneously applied signal $d_n$ for producing a corresponding bivalued output signal $D_n$ representative of the difference between the numbers represented by the delayed signal and simultaneously applied signal, the successive output signals $D_n$ thereby produced comprising a difunction output signal train non-numerically representative of the rate of change with respect to $x$ of the varying quantity.

11. A difunction differentiating apparatus for operating upon successively applied bivalued electrical signals $d_n$ of an input difunction signal train representing a quantity varying with time, where $n$ is a number having the successive values $j$, $j+1$, $j+2$, . . ., each bivalued signal $d_n$ representing either a predetermined number $N_1$ or a predetermined number $N_2$ and being applied to the differentiating apparatus at a time $n\Delta t$, where $\Delta t$ is a fixed increment of time, said differentiating apparatus comprising: a delay element responsive to each applied signal for presenting the signal at an output terminal after a time interval $p\Delta t$ where $p$ is a predetermined integer greater than two, and a difunction subtracter coupled to said output terminal for combining each delayed signal and a simultaneously applied signal $d_n$ for producing a corresponding output signal $D_n$ representative of the difference between the numbers represented by the simultaneously applied and delayed signals, the successive output signals $D_n$ thereby produced comprising an output difunction signal train representative of the rate of change with respect to time of the varying quantity.

12. A difunction differentiating apparatus for operating upon successively applied bivalued electrical signals $d_n$ of an input difunction signal train synchronized with respect to periodic timing signals of a timing signal source and representing a quantity varying with time, where $n$ is a number having successive values of $j$, $j+1$, $j+2$, . . ., each bivalued signal $d_n$ representing either a predetermined first number $N_1$ or a predetermined second number $N_2$ and being applied to the differentiating apparatus at a time $n\Delta t$, where $\Delta t$ is a fixed increment of time equal to the period of the timing signals, said differentiating apparatus comprising: means for delaying each applied signal by a time interval $p\Delta t$, where $p$ is a predetermined integer greater than two, to electrically present at time $n\Delta t$ a delayed signal $d_{n-p}$; and means operable in response to the periodic timing signals for combining signals $d_n$ and $d_{n-p}$ to produce an output difunction signal train comprising a series of bivalued electrical signals $D_n$, synchronized with respect to the timing signals, each signal $D_n$ being representative of the difference between the numbers represented by signals $d_n$ and $d_{n-p}$, said means for combining producing a single signal $D_n$ for each period of the timing signals, whereby the output signal train thus produced is representative of the rate of change with respect to time of the varying quantity.

13. The difunction differentiating apparatus defined by claim 12 wherein each bivalued signal $d_n$ represents either a predetermined first number $N_1=1$ or a predetermined second number $N_2=-1$ and wherein said means for combining signals $d_n$ and $d_{n-p}$ includes a difunction subtracter responsive to each pair of signals $d_n$ and $d_{n-p}$ for producing a signal which has the same value as signal $d_n$ whenever signals $d_n$ and $d_{n-p}$ have different values and having successively alternate values each successive time that signals $d_n$ and $d_{n-p}$ have the same values.

14. A differentiating apparatus for operating upon serially produced fixed period bivalued electrical signals of an input difunction signal train non-numerically representing a quantity varying with time, said apparatus comprising: a subtracter network having 1st and 2nd input terminals and responsive to each application of a pair of bivalued signals to said first and second terminals respectively for producing a resultant output signal representing the difference of the values of the applied signals, a delay element responsive to each application of a bivalued signal thereto for applying the bivalued signal after a predetermined fixed time delay greater than two of the fixed periods of the bivalued electrical signals, to said 2nd input terminal of said subtracter network, and means for simultaneously applying each signal of said input difunction signal train to said delay element and to said first input terminal of said subtracter network, whereby the successive output signals produced by said subtracter network comprise an output signal train non-numerically representative of the rate of change with respect to time of the varying quantity.

References Cited in the file of this patent

UNITED STATES PATENTS

| | | |
|---|---|---|
| 2,403,561 | Smith | July 9, 1946 |
| 2,429,228 | Herbst | Oct. 21, 1947 |
| 2,568,724 | Earp et al. | Sept. 25, 1951 |
| 2,570,220 | Earp et al. | Oct. 9, 1951 |
| 2,609,143 | Stibitz | Sept. 2, 1952 |
| 2,701,095 | Stibitz | Feb. 1, 1955 |
| 2,733,430 | Steele | Jan. 31, 1956 |
| 2,762,564 | Samson | Sept. 11, 1956 |
| 2,856,126 | Kilburn | Oct. 14, 1958 |

FOREIGN PATENTS

| | | |
|---|---|---|
| 733,350 | Great Britain | July 13, 1955 |
| 1,094,570 | France | Dec. 8, 1954 |